United States Patent [19]

Pagliaro et al.

[11] Patent Number: 4,465,699

[45] Date of Patent: Aug. 14, 1984

[54] DECAFFEINATION PROCESS

[75] Inventors: Fulvio A. Pagliaro, Marysville; James G. Franklin, Union County, both of Ohio; Rupert J. Gasser, Zumikon, Switzerland

[73] Assignee: Societe d'Assistance Technique pour Produits Nestle S.A., Lausanne, Switzerland

[21] Appl. No.: 742,094

[22] Filed: Nov. 16, 1976

Related U.S. Application Data

[63] Continuation-in-part of Ser. No. 605,717, Aug. 18, 1975, abandoned, which is a continuation-in-part of Ser. No. 527,870, Nov. 27, 1974, abandoned.

[51] Int. Cl.$^3$ .............................. A23F 3/36; A23F 5/20
[52] U.S. Cl. ................................. 426/428; 426/424; 426/427; 544/274; 544/275
[58] Field of Search ............... 426/417, 427, 428, 422; 260/256; 544/274, 275

[56] References Cited

U.S. PATENT DOCUMENTS

| | | | |
|---|---|---|---|
| 716,878 | 12/1902 | Faunce | 426/428 |
| 1,039,961 | 10/1912 | Klein | 426/427 |
| 1,716,323 | 6/1929 | Rector | 426/428 X |
| 2,129,596 | 9/1938 | Waterman et al. | 426/428 X |
| 2,309,092 | 1/1943 | Berry et al. | 426/428 X |
| 2,391,981 | 1/1946 | Kremers | 426/428 |
| 2,472,121 | 6/1949 | Orufelt | 426/428 X |
| 2,817,588 | 12/1957 | Barch | 426/428 |
| 3,092,498 | 6/1963 | White et al. | 426/428 |
| 3,361,571 | 1/1968 | Nutting et al. | 426/428 X |
| 3,669,679 | 6/1972 | Panzer et al. | 426/428 |
| 3,671,262 | 6/1972 | Wolfson et al. | 426/428 |
| 3,671,263 | 6/1972 | Patel et al. | 426/428 |
| 3,682,648 | 8/1972 | Mitchell et al. | 426/428 |
| 3,700,464 | 10/1972 | Patel et al. | 426/428 |
| 3,700,465 | 10/1972 | Lawrence et al. | 426/428 |
| 3,740,230 | 6/1973 | Mohlmann | 426/428 |

FOREIGN PATENT DOCUMENTS

| | | | |
|---|---|---|---|
| 166486 | 4/1934 | Switzerland | |
| 366305 | 2/1932 | United Kingdom | 426/428 |
| 635185 | 4/1950 | United Kingdom | 426/428 |

OTHER PUBLICATIONS

Switz, Coffee Processing Technology, vol. 2, 1963, Avi Publ. Co.; Westport, Conn., pp. 207–215.
"Bailey's Industrial Oil and Fat Products," Edited by Swern, 3rd Ed., 1964, Interscience Publ.; N.Y., pp. 3–7, 126.
Biochem. Z., 124, (1921), pp. 192–205.
Chem Abstracts, 33:4668[8], (1938), Stimulating Action of Coffee.
Chemical Abstracts, 4, 63, (1910).
Chemical Abstracts 38, 5608, (1944).
Kippenberger, Zeitschrift fur Angewandte Chemie, vol. 22, pp. 1837–1841, No. 38, Sep. 17, 1909.
Guimaraes Revista de Qumica Industrial (Rio de Janeiro), Mar. 1944, p. 26.

Primary Examiner—Joseph M. Golian
Attorney, Agent, or Firm—Vogt & O'Donnell

[57] ABSTRACT

A process for producing a decaffeinated vegetable material, such as coffee or tea in aqueous extract or solid form, for use in preparation of beverages, which comprises:

(a) contacting a caffeine-containing composition with a liquid, water-immiscible fatty material which is capable of removing caffeine therefrom;

(b) maintaining said vegetable material and said fatty material in contact for a time sufficient to transfer caffeine from said vegetable material to said fatty material; and (c) separating the decaffeinated vegetable material from the caffeine-laden fatty material.

Other features of the invention are described in the specification.

12 Claims, No Drawings

DECAFFEINATION PROCESS

CROSS REFERENCE TO RELATED APPLICATIONS

This application is a continuation-in-part of our earlier filed copending U.S. patent application, Ser. No. 605,717, filed Aug. 18, 1975, now abandoned, which in turn is a continuation-in-part of our earlier filed copending U.S. patent application Ser. No. 527,870, filed Nov. 27, 1974, now abandoned.

BACKGROUND OF THE INVENTION

1. Field of the Invention

This invention relates to the field of processes for decaffeinating a caffeine-containing vegetable material such as tea and coffee.

2. Description of the Prior Art

There has long been a recognized demand for decaffeinated vegetable materials, particularly beverages such as coffee and tea. The customary prior art techniques for decaffeination have generally involved the use of organic solvents such as trichlorethylene or chloroform, which solvents were contacted either with the vegetable material or with an aqueous extract thereof. After sufficient caffeine was transferred to the solvent, the resultant solution of caffeine could be separated so as to allow further processing of the beverage from the decaffeinated material or extract, as the case might be.

These organic solvent-based decaffeination techniques have several disadvantages. Of particular concern to the ultimate consumer, the utilization of prior art decaffeination solvents often results in substantial loss, or denaturization, of valuable flavor and aroma constituents of the eventual beverage. Thus, decaffeination has frequently been responsible for products lacking in high quality characteristics.

Further, because the prior art solvents themselves are often detrimental, concern has been evidenced respecting contacting them with vegetable materials from which comestibles are to be produced. This concern has resulted in the development of complex and stringent processing techniques in order to insure solvent separation from the eventual products.

SUMMARY OF THE INVENTION

According to the process of this invention, a caffeine-containing vegetable material such as tea or coffee in extract or whole form is decaffeinated by the steps of:
(a) contacting a caffeine-containing composition with a liquid, water-immiscible fatty material which is capable of removing caffeine therefrom;
(b) maintaining said vegetable material and said fatty material in contact for a time sufficient to transfer caffeine from said vegetable material to said fatty material; and
(c) separating the decaffeinated vegetable material from the caffeine-laden fatty material.

The process of this invention does not require the use of halogenated organic solvents such as those used in known and conventional decaffeination processes.

Other features and aspects of this invention are hereinafter set forth in the description of the preferred embodiments.

DESCRIPTION OF THE PREFERRED EMBODIMENTS

In accordance with the present invention, a liquid, water-immiscible fatty material is utilized as the caffeine solvent for the decaffeination of caffeine-containing vegetable substances. By "fatty material" as the term is utilized herein, it is meant any of the animal or vegetable fats or oils or admixtures or fractions thereof which assume a liquid form within the temperature range, discussed hereinafter, useful for the removal of caffeine from the caffeine-containing composition. These fatty materials are customarily composed of esters of fatty acids, usually glycerol esters, and may be utilized in either their native chemical form or in those resultant from conventional treatments as are known in the art.

Thus, for example, the present fatty materials may be in either unsaturated or saturated form. Similarly, unrefined or conventionally refined oils as well as oils with or without such normal additives as anti-oxidants and preservatives are all useful within the scope of the present invention. It is preferred, however, that the fatty material contain few surfactants, either natural or artificially added, as they promote formation of stable emulsions which form upon agitation of liquid compositions utilized in accordance with the present invention and interfere with facile separation of oil and water phases.

The fatty materials of the present invention are generally inclusive of commercial oils, fats, etc. and thus myriad examples are readily available. Of these fatty materials, those which are edible are highly preferred for processing materials to be used as comestibles. Illustrative of fatty materials which are advantageously employed in the process of this invention are safflower oil, soy bean oil, corn oil, peanut oil, coffee oil, triolein, olive oil, and lard.

These fatty materials are useful for effecting virtually any desired degree of decaffeination of a vegetable material. Thus, although essentially complete caffeine removal can be accomplished, a lesser degree of decaffeination can also be provided. The removed caffeine is a valuable, commercial product.

Caffeine-containing vegetable materials to be decaffeinated in accordance with the present invention are most suitably in solid form or an aqueous extract. Where a solid form is employed, water is desirably present and may be contained within the solid, e.g., hydrated coffee beans. Aqueous extracts of vegetable material and vegetable materials exhibiting a substantial moisture content are preferred.

Decaffeination of Aqueous Extracts

Thus, aqueous extracts of tea or roast ground coffee are well-known and may be produced by means conventional in the art. Because these extracts, normally termed "brews", are themselves eventually converted into beverage products, however, they should ordinarily be treated in a manner so as to minimize loss and/or degradation of valuable flavor constituents. One particular class of constituents of these brews, the so-called "volatiles" or "aromatics", is particularly sensitive in this regard. Accordingly, it is desirable to remove the aromatic constituents of brews prior to decaffeination or other processing and to reincorporate them at or near the end of the beverage production process. The removal, preservation and reincorporation of the volatile or aromatic constituents of vegetable materials may be accomplished by means well known in the prior art.

Aqueous solutions of vegetable material usually contain, for example, from 2 to 60% soluble solids by total weight. Ordinarily, however, it is preferred that the solutions to be decaffeinated have a soluble solids concentration of from 10 to 50%, preparatory to contacting with the fatty material caffeine solvent. Such concentrations are preferred for the purpose of minimizing the volumes of liquids utilized in the decaffeination sequence, as well as for the purpose of reducing the quantity of water which must eventually be removed from a brew which is to be dried to solid form.

Concentration may be obtained through techniques well known to the prior art. It is desirable such concentration be carried out under conditions which minimize the possibility of adverse flavor effect. Accordingly, it is preferred that techniques such as low pressure evaporation or freeze concentration, which avoid exposing the brew to higher temperature for any substantial period of time, be utilized.

An aqueous extract of vegetable material, which has been formed specifically for the purpose of decaffeination and will not constitute any portion of the eventual beverage product, may also be employed. This embodiment of the present invention is most suitable for vegetable materials which normally require roasting or some other treatment to form many of their desired beverage constituents as otherwise those valuable constituents could be solubilized in the extract and possibly lost.

Exemplary of this embodiment of the present invention is an aqueous extract of green coffee beans. Such beans may be extracted with water so as to remove their caffeine content. The resultant extract, however, contains relatively few of the normal coffee beverage constituents inasmuch as these water-soluble constituents are largely produced only upon subsequent roasting of the beans.

The formation of this extract is fairly simple. All that is required is that the green beans be contacted with a weight of water sufficient for dissolving their caffeine content. Ordinarily, the caffeine is dissolved by counter-current extraction with water. Alternatively, this step can be effected simply by slurrying the beans in water or any equivalent contact therebetween for a period of time, usually 10 to 60 minutes, sufficient to allow the desired degree of decaffeination.

When green beans are extracted with water, however, some valuable beverage constituents may also be removed to the aqueous phase. One technique by which the avoidance of substantial loss of these desired constituents has been insured is through closed, cyclic circulation of the aqueous extraction medium. Pursuant to this technique, the aqueous medium rapidly obtains its maximum concentration of the various water-soluble constituents, including caffeine, of green beans. Upon subsequent selective removal of the caffeine from the medium, there is obtained a recyclable aqueous extraction medium which rapidly approaches dynamic equilibrium with respect to those water-soluble constituents of green beans which are not removed by decaffeination of the medium.

With such a dynamic equilibrium in effect, the recycled caffeine-free extraction medium will, upon recontact with green coffee beans, remove essentially only caffeine therefrom. Thus, within a short time, a system may be obtained whereby essentially only caffeine is removed from the green beans. At least one such technique and system is known in the art through U.S. Pat. No. 2,309,092 of Berry et al. In order more fully to detail this system, the disclosure of this patent is incorporated herein by reference as if it were set forth here in its entirety.

Both the recirculating extraction medium, exemplified in the Berry et al. patent, and the brew discussed above are essentially aqueous solutions which contain both caffeine and various water-soluble vegetable material constituents. Accordingly, the present technique of treating liquid vegetable extracts with fatty material to remove caffeine therefrom may be applied to each in much the same manner. Thus, a vegetable extract is admixed with a suitable volume of a liquid water-immiscible fatty material and maintained in contact therewith until caffeine has migrated into the fatty material. The aqueous and fatty materials are then separated. These steps may be accomplished quite simply, because the fact that both phases are liquid permits easy and thorough admixture under agitation, while the immiscibility of the two phases, aqueous and fatty, allows substantially complete separation by many known techniques, including decantation.

Caffeine removal varies to some degree with the fatty material employed, and is affected by the distribution coefficient. The distribution coefficient for caffeine between the fatty and aqueous phases at equilibrium is defined by the relationship:

$$\text{Distribution coefficient} = \frac{\text{caffeine concentration in fatty phase}}{\text{caffeine concentration in aqueous phase}}$$

at any given temperature. Higher distribution coefficients reflect a superior ability to effect decaffeination.

Table 1 sets forth exemplary data for various fatty materials at different temperatures:

TABLE I

SOLUBILITY CHARACTERISTICS OF FATTY MATERIALS

| Fatty Material | Temperature | Caffeine Distribution Coefficient for Equal Volumes of Aqueous and Fatty Phases |
|---|---|---|
| Safflower Oil | 20° C. | .064 |
|  | 10° C. | .067 |
| Soy Bean Oil | 20° C. | .064 |
|  | 10° C. | .059 |
| Corn Oil | 20° C. | .064 |
|  | 15° C. | .064 |
|  | 10° C. | .071 |
|  | 5° C. | .085 |
| Peanut Oil | 10° C. | .067 |
| Coffee Oil | 23° C. | .140 |
| Triolein (oleic acid ester of glycerol) | 23° C. | .085 |
| Olive Oil | 23° C. | .076 |
| Lard | 65° C. | .197 |

These data reflect the equilibrium achieved by single admixtures of volumes of fatty material and aqueous caffeine solutions. The fatty materials are representative, and depending on the particular history of a given material, some variation in the distribution coefficient would be expected. With these data and the additional description, provided herein, however, those of ordinary skill in the art will be able to determine the characteristics and optimum conditions of use for other fatty materials within the scope of the present invention.

Only a few minutes of contact between fatty and aqueous phases are required to approach or reach equilibrium. The optimum temperature for decaffeination can be readily determined in the manner described above. The freezing point of the aqueous vegetable extract and the solidification point of the fatty material represent the lower limit of useful temperatures. At the other end of the range, excessively high temperatures which could cause flavor degradation should be avoided. The temperature range of about 0° to 50° C. is preferred and about 10° to 30° C. is more preferred.

The degree of decaffeination is in part controlled through the ratio of vegetable material to fatty material. Ordinarily, a ratio of fatty material to aqueous vegetable material of about 20:1 will achieve only partial decaffeination in a single contacting sequence. Thus for example, at that ratio, fatty materials having distribution coefficients of 0.035 and 0.085 accomplish about 40% and 65% decaffeination, respectively. Increases in the ratio of fatty to vegetable material will, of course, increase this degree of decaffeination, while lower ratios decrease it.

The means through which contact of the fatty material with the aqueous extract is accomplished also affects the degree of decaffeination. By employing a multi-step sequence wherein the liquid vegetable material is contacted with successive aliquots of the fatty material, any desired degree of decaffeination may be reached.

This preferred embodiment may most simply be practiced by contacting the caffeine-containing extract with an aliquot of fatty material, maintaining the fatty and aqueous phases in contact for a period of time sufficient to effect substantial transfer of caffeine into the fatty material (such a transfer ordinarily being in an amount greater than about 70% of the equilibrium distribution therein), separating the aqueous and fatty phases and then repeating this sequence of steps with additional aliquots of caffeine-free fatty material.

Still another form of this preferred embodiment employs counter-current decaffeination wherein an initially caffeine-free fatty material is passed through consecutive volumes of vegetable material arrayed in reverse order by caffeine content. Thus, the fresh fatty material first contacts the most decaffeinated vegetable material volumes, and then those of higher caffeine content. When the first vegetable material volume reaches the desired degree of decaffeination, it is simply disconnected from the system, and a new volume, having the highest caffeine content, is connected downstream to maintain a constant number of volumes on stream and a proper order of contact with the fatty material.

Decaffeination of Solid Vegetable Materials

The present invention also includes utilization of a fatty material for decaffeination of solid vegetable materials, such as green coffee beans which may be provided in ground beans, crushed or, most desirably, whole form. Roast coffee beans may also be utilized; however, volatiles should preferably first be removed to avoid undue loss of valuable beverage constituents. Consequently, the decaffeination of whole green beans is most preferred and the following discussion of this embodiment is particularly directed thereto.

Use of solid vegetable materials is a particularly preferred embodiment of the present invention inasmuch as it obviates certain disadvantages of dealing with aqueous solutions of vegetable material. Thus, the separation of the fatty material from the caffeine-containing composition is facilitated by the fact that, while the fatty material remains liquid, the vegetable material is in solid form. Separation of the beans and fatty material may even conveniently be effected by simple drainage of the beans and, where centrifugation is utilized to facilitate this separation, fairly simple machinery is adequate.

Further, in the separation of green coffee beans from a liquid fatty material, the degree of separation may be essentially 100%. Whereas even the most sophisticated of immiscible liquid separations may result in some retainment of one liquid in the other, no such problem is encountered here. Once most of the fatty material has been separated from the beans, a secondary purification step, such as direction of a burst of steam through the beans, permits essentially 100% separation of retained fatty material. Moreover, even this additional step may be rendered unnecessary. Because of the post-decaffeination roasting and extractive processing of the beans, where a substantially flavorless fatty material is utilized, little if any effect upon the flavor of the eventual beverage product will result even if separation is incomplete.

In order to be in a form readily susceptible to caffeine removal, green coffee beans should contain some moisture. The beans ordinarily naturally contain from 8 to 10% moisture, however, higher amounts of at least about 20% water (based on dry weight of the beans) are preferred. The upper limit of moisture content, however, is more variable. Decaffeination of a caffeine-containing composition comprising green beans is desirably performed in the absence of free liquid water, so as to avoid the separation problems incident to an admixture of liquids and the possible loss of valuable vegetable constituents solubilized in that water. Accordingly, in this embodiment of the present invention, it is preferred that the green beans contain between about 20 and 60%, most preferably between about 40 and 60%, water.

The incorporation of water into green beans is easily accomplished. Thus, for example, the beans may simply be immersed in water and there maintained for several hours, until they have absorbed the desired amount of moisture. Thereafter, they may easily be separated from the excess water, for example, by centrifugation. Through the use of heat and/or pressure, this incorporation or "swelling" of the beans may be accelerated. Thus, for example, where beans are immersed in water at a temperature of about 80° to 90° C., they achieve the desired moisture content much more quickly. Also, upon being subjected to steaming at about 2 atmospheres, the desired moisture content is achieved in even less time—normally, about 1 to 30 minutes.

Once the beans have been swollen to an appropriate moisture content, they are placed in a bath or stream of fatty material until the desired degree of bean decaffeination has been achieved. Here, the time of admixture becomes significant: transfer of caffeine from the beans is much slower than from dilute solution. Accordingly, it is desirable that periods of at least 30 minutes, with longer periods for more complete degrees of decaffeination, be permitted for this step.

In processes intending high degrees of decaffeination, it is also important to ensure that the moisture content of the swollen beans does not significantly decrease during treatment. Contact between swollen beans and fatty material can result in lower moisture contents due to loss of water from the beans to the fatty material. Where this decrease brings the beans to a moisture content below the preferred 40 to 60% range, there occurs a corresponding decrease in the efficiency of decaffeination.

It is therefore preferred that the fatty material utilized for decaffeination contain a small amount of water. This amount acts to maintain the aqueous equilibrium between the beans and fatty material. On the one hand, it prevents excessive removal of water from the beans. On the other, it minimizes the total amount of water present during decaffeination, thereby avoiding undue loss of non-caffeine, water-soluble bean constituents. From 0.9 to 1.2%, most desirably about 1.0%, of water by weight of fatty material is ordinarily utilized in this preferred embodiment of this invention.

As with decaffeination of aqueous extracts, the use of multi-step as opposed to single-step contact of fatty material with the vegetable material may be practiced in the manner previously described. Thus successive employment of aliquots of caffeine-free fatty material to decaffeinate and, more preferably, countercurrent extraction with fatty material, are desirable embodiments of the present invention.

One aspect by which the decaffeination of swollen green beans differs substantially from decaffeination of aqueous caffeine-containing extracts lies in the effect of temperature. As previously noted, where decaffeination involves the contacting of fatty material with an aqueous caffeine-containing solution, differences in temperature during such contacting do not have a large effect. In treating solid beans, however, increases in the temperature at which decaffeination is conducted may dramatically increase the rate of caffeine removal.

Accordingly, to achieve maximum efficiency of caffeine removal, decaffeination of beans is preferably carried out at as high a temperature as is practicable. Degradation of fatty materials generally occurs at or around a temperature of about 150° C., and therefore this temperature represents a maximum limit for decaffeination. Also, for prolonged contacting times, very high temperatures may result in some degradation of eventual beverage constituents. Accordingly, it is preferred that the present decaffeination of green beans be performed within the temperature range of from about 50° C. to 120° C.

Regeneration of Fatty Material

A further aspect of the present invention involves regenerating caffeine-containing fatty material so as to permit reuse thereof in the decaffeination process. This may be efficiently achieved by contacting the separated caffeine-containing fatty material with water, permitting the transfer of the caffeine into aqueous phase, and then separating the fatty material to permit its recycle for further decaffeination. In large measure, the regeneration sequence reverses the steps already described above with respect to decaffeination. In addition, however, it readily permits isolation of by-product caffeine from the regenerate aqueous phase.

For regeneration of the fatty material, the efficiency of caffeine removal to aqueous phase is again governed by the same parameters of temperature, the caffeine distribution coefficient for a particular fatty material, and the weight ratio of fatty material to water as discussed above with respect to the separation of caffeine from an aqueous solution of vegetable material.

Because flavor degradation is not a serious problem during regeneration, the eventual product constituents not being present, the temperature during regeneration may be utilized to improve the efficiency of caffeine transfer to the aqueous phase. Thus, where the solubility of caffeine in water increases more rapidly than in the fatty material with higher temperatures, it is advantageous to effect regeneration at a temperature up to 100° C. (and even higher where pressure is utilized to avoid evaporation). If on the other hand, lower temperatures favor this transfer then they should be employed.

Also, because it is here desired to transfer caffeine from the fatty material to an aqueous solution, the relatively greater solubility of caffeine in water permits the utilization of low fatty to aqueous phase ratios, even for substantially complete transfer. Additionally, where it is desired further to minimize the amounts of water utilized in regeneration of the fatty material, a multi-step regeneration sequence comprising extraction of the caffeine-laden fatty material with successive aliquots of water or countercurrent extraction of fatty material with water, may be utilized in the manner described hereinabove so as to facilitate the efficient regeneration of the fatty material.

Incident to regeneration of the fatty material through removal of caffeine with water, it has been discovered that the separated fatty material can contain, even when separation of these immiscible liquids is accomplished through such normally efficient means as centrifugal separation, about 1% by weight of water. This water is desirably removed from the fatty material before recontacting with vegetable material so as to avoid dilution of liquid vegetable materials. Removal of the entrained water in the fatty material can be accomplished by such means as a flash distillation under vacuum conditions or equivalent known techniques.

As previously described, certain preferred embodiments of this invention relating to decaffeination of solid vegetable materials rely upon utilizing a fatty material containing a small amount of water. In the practice of these embodiments, the dilution factor becomes negligible. Therefore, the regenerated fatty material containing entrained water may be used directly for further decaffeination. Alternatively, its aqueous content may be adjusted, for example, by adding water or by partial stripping, as required to bring it to an optimum water content.

Even where the presence of water in the fatty material is desired, however, it is preferred to remove the entrained water and then add the desired amount of water to the dry fatty material. This sequence of steps ensures an optimum water content and avoids the difficulties and/or interruptions required for monitoring the entrained water content of regenerated fatty material and then adjusting it, as desired.

Clearly, many variations in the steps and materials comprising the present process are possible without departing from the scope of this invention. The following examples are illustrative of the present invention. Unless otherwise noted herein, percentages are on a weight basis.

EXAMPLE 1

An aqueous brew extract of roast ground coffee beans is stripped with steam to remove volatiles, 10 kilograms of the stripped brew, at a soluble solids concentration of 19% and a temperature of 22° C., are then added to 179 kilograms of corn oil at 60° C. The resultant admixture is agitated for 30 minutes and then passed through a centrifugal separator at a rate of 3.16 kilograms per minute. The brew, which is separated from the oil in the centrifuge, exhibits a 51% degree of decaffeination.

By repeating this treatment of the brew with additional corn oil, the degree of decaffeination is successively increased until essentially complete caffeine removal is effected.

EXAMPLE 2

A tea extract having a soluble solids concentration of 27.6% and a temperature of 22° C. is mixed with corn oil in a ratio of 1:20, respectively, and maintained under agitation for 10 minutes. The admixture is then subjected to centrifugal separation to yield a tea extract exhibiting 63% decaffeination. Again, retreatment affords a means for achieving any greater desired degree of decaffeination.

EXAMPLE 3

Green coffee beans are decaffeinated utilizing a recirculating aqueous medium which has reached an equilibrium soluble solids concentration of 29% and is at a temperature of 22° C. Decaffeination is performed by passing the aqueous medium countercurrently through a column of green beans, with essentially caffeine-free beans being removed from the column at one end and natural green beans added at the other. Within the circulating aqueous system, and at a point removed from the column, aqueous medium is diverted through a centrifugal extractor to which coffee oil at 50° C., in a ratio of 21:1 to the medium, is added for removal of caffeine from the aqueous extract. Heat exchangers in the system are used to maintain the temperatures of these two liquids essentially as indicated.

With a single pass of the medium and oil through the centrifuge, over one-third of the caffeine in the medium is removed. A second pass of the medium, and a further equal aliquot of oil, increases the decaffeination of the medium to over 60%.

After roasting, grinding and extracting separate samples of decaffeinated beans obtained after the single and second passes, both sample aqueous extracts are essentially caffeine-free.

EXAMPLE 4

Green coffee beans are subjected to steam at 110° C. until they exhibit a moisture content of 45% by total weight. 10 kg. aliquots are placed into separate extraction chambers. Each of the aliquots is decaffeinated for four hours at 95° C. with corn oil.

In one Trial, "A", oil is passed through only one chamber, in a ratio of about 40 parts of oil per part of dry beans by weight. The oil is thereafter regenerated by extraction with water to remove its caffeine content, the water is removed, and the oil is then recirculated to maintain a continuous flow of caffeine-free corn oil to swollen beans in the chamber.

In a second Trial, "B", four chambers are connected in series so that the corn oil flows through each. A ratio of about 40 parts of oil per part of dry beans by weight is again used. Regeneration and recirculation of the oil is accomplished only after it has passed through all four chambers. One chamber, the first contacted by oil, is removed each hour and a new chamber is added at the downstream end. In this manner, and after a start-up period of 6 hours, a system is achieved wherein the four chambers contain beans of varying caffeine content by virtue of the fact that they have been subjected to different times of onstream oil decaffeination.

The caffeine contents of beans from Trial "A" and from a chamber which has passed through all four stages of Trial "B" after start-up are analyzed. Despite the fact that each of these beans had been decaffeinated under essentially the same physical conditions, their respective degrees of decaffeination are markedly different. Thus, while the beans of Trial "A" exhibit 52% decaffeination, those of Trial "B" exhibit 92% decaffeination. It is therefore evident that multi-step extraction substantially increases the efficiency of decaffeination.

EXAMPLE 5

An aqueous brew extract of roast ground coffee beans is stripped with steam to remove volatiles. 200 grams of the stripped brew having a soluble solids concentration of 18.4% are then admixed with 2 kg. of safflower oil and agitated for 30 minutes at 20° C. This admixture is then centrifuged to break the emulsion and the brew separated by decantation. The separated brew exhibits a 56% degree of decaffeination.

EXAMPLE 6

The process of Example 5 is repeated with the change that 2 kg. of soy bean oil is substituted for the safflower oil. After separation, the brew exhibits a 56% degree of decaffeination.

EXAMPLE 7

The process of Example 5 is repeated substituting 2 kg. of peanut oil for the safflower oil. Additionally, the brew and oil are maintained at 10° C., instead of 20° C., throughout the process. The separated brew exhibits a 56% degree of decaffeination.

EXAMPLE 8

Green coffee beans are decaffeinated with coffee oil obtained from spent grounds, in a four-chamber countercurrent extraction zone in the manner described for Trial "B" of Example 4. Each chamber, or cell, contains 6.8 kg. of beans by dry weight. The oil is maintained at 105° C. and extraction is performed over a total extraction period of 6 hours (1.5 hours for each cycle). A total oil to bean weight ratio of 120:1 is utilized.

After each pass of the recirculating oil through all four chambers of the extraction zone, the oil is regenerated by aqueous extraction of caffeine and is then stripped to remove its aqueous content. A predetermined measure of water is admixed with the oil preparatory to its recirculation.

Utilizing the foregoing procedure, four different trials are made. These trials differ essentially in the addition of varying amounts of water to stripped, caffeine-free fatty material. Data for steady-state conditions of operation of each trial are as follows:

| Trial No. | Water Content of Bean Charge | Water Content Maintained In Oil | Percent Decaffeination | Non-Caffeine Solids Loss | Type of Coffee Beans |
|---|---|---|---|---|---|
| 1 | 54% | 0.37% | 87% | 2.5% | "Milds" (1.33% caffeine) |
| 2 | 55% | 1.00% | 97% | 1.1% | "Milds" (1.33% caffeine) |
| 3 | 55% | 0.75% | 69% | 2.4% | "Robusta" (2.15% caffeine) |
| 4 | 57% | 1.20% | 97% | 5.2% | "Robusta" (2.15% caffeine) |

These data evidence the fact that proper moisture contents permit optimum decaffeination with minimal loss of non-caffeine bean constituents. The efficiency of decaffeination decreases where the concentration of water present in the fatty material during decaffeination decreases. It is also shown that, although the efficiency of decaffeination remains high at higher aqueous contents for the fatty material, the high level of water present in the system results in an excessive loss of non-caffeine solubles from the beans and thus leads to a markedly less desirable process.

We claim:

1. A process for producing decaffeinated solid vegetable material suitable for use in preparation of beverages, which comprises:
   (a) swelling a caffeine-containing solid vegetable material with water to provide a moisture content of between about 20% and about 60%, based on the dry weight of the vegetable material;
   (b) contacting the swollen vegetable material with a liquid, water-immiscible edible fatty material having incorporated therein an amount of water sufficient to maintain an aqueous equilibrium between the vegetable material and the fatty material and maintaining such contact to transfer caffeine from the coffee to the fatty material;
   (c) separating the vegetable material from the caffeine-laden fatty material; and
   (d) repeating steps (b) and (c) while maintaining the moisture content of the vegetable material above about 20% until at least about 92% of the caffeine has been removed from the vegetable material.

2. A process as claimed in claim 1 in which the vegetable material is roast coffee, the process further comprising the step of removing volatiles from the roast coffee prior to said contacting step.

3. A process as claimed in claim 1 in which the vegetable material is tea.

4. A process for producing decaffeinated green coffee suitable for use in preparation of beverages, which comprises:
   (a) swelling green coffee with water to provide a moisture content of between about 20% and about 60%, based on the dry weight of the coffee;
   (b) contacting the swollen coffee with a liquid, water-immiscible edible fatty material having incorporated therein an amount of water sufficient to maintain an aqueous equilibrium between the coffee and the fatty material and maintaining such contact to transfer caffeine from the coffee to the fatty material;
   (c) separating the coffee from the caffeine-laden fatty material; and
   (d) repeating steps (b) and (c) while maintaining the moisture content of the coffee above about 20% until at least about 92% of the caffeine has been removed from the coffee.

5. A process as claimed in claim 4 in which the coffee is swollen to provide a moisture content between about 40% and about 60% and the moisture content of the coffee is maintained above about 40% until at least about 92% of the caffeine has been removed from the coffee.

6. A process as claimed in claim 4 in which the contacting and separating steps are repeated and the moisture content of the coffee is maintained above about 20% until at least about 97% of the caffeine has been removed from the coffee.

7. A process as claimed in claim 6 in which the coffee is swollen to provide a moisture content between about 40% and about 60% and the moisture content of the coffee is maintained above about 40% until at least about 97% of the caffeine has been removed from the coffee.

8. A process as claimed in claim 4 in which the fatty material is selected from the group consisting of safflower oil, soy bean oil, corn oil, peanut oil, coffee oil, triolein, olive oil and lard.

9. A process as claimed in claim 8 in which said fatty material is coffee oil.

10. A process as claimed in claim 4 in which the repeated contacting of the coffee with the fatty material is carried out in countercurrent fashion.

11. A process as claimed in claim 4 in which the caffeine-laden fatty material is regenerated by removing caffeine therefrom.

12. A process as claimed in claim 4 in which step (b) is carried out at between about 50° C. and about 120° C.

* * * * *

UNITED STATES PATENT AND TRADEMARK OFFICE
CERTIFICATE OF CORRECTION

PATENT NO. : 4,465,699
DATED : August 14, 1984
INVENTOR(S) : Fulvio A. Pagliaro, et al.

It is certified that error appears in the above—identified patent and that said Letters Patent is hereby corrected as shown below:

Column 5, line 53, insert a comma following "beans".

Column 5, line 54, "ground beans, crushed" should read
-- ground, crushed --.

Column 6, line 21, insert a period before "The".

Signed and Sealed this

Eighth Day of January 1985

[SEAL]

Attest:

Attesting Officer

GERALD J. MOSSINGHOFF

Commissioner of Patents and Trademarks